United States Patent [19]

Weemes et al.

[11] Patent Number: 4,510,205

[45] Date of Patent: Apr. 9, 1985

[54] COPOLYESTERETHERS COATED WITH SARAN

[75] Inventors: Doyle A. Weemes, Greeneville; Robert W. Seymour, Kingsport, both of Tenn.

[73] Assignee: Eastman Kodak Company, Rochester, N.Y.

[21] Appl. No.: 498,442

[22] Filed: May 26, 1983

[51] Int. Cl.$^3$ .................. B32B 27/30; B05D 1/36; B28B 3/20
[52] U.S. Cl. .................. 428/483; 428/518; 428/520; 428/522; 428/35; 427/407.1; 427/412.5; 264/176 R; 264/209.8; 206/438
[58] Field of Search ............... 428/483, 480, 518, 520, 428/522

[56] References Cited

U.S. PATENT DOCUMENTS

| | | | |
|---|---|---|---|
| 4,121,016 | 10/1978 | Garrison, Jr. | 428/483 |
| 4,219,629 | 8/1980 | Storm | 428/480 |
| 4,349,469 | 9/1982 | Davis et al. | 528/308 |
| 4,382,115 | 5/1983 | Takahashi | 428/483 |
| 4,407,888 | 10/1983 | Crofts | 428/483 |

*Primary Examiner*—Patricia C. Ives
*Attorney, Agent, or Firm*—John F. Stevens; Daniel B. Reece, III

[57] ABSTRACT

Coated articles comprising a substrate and a coating, the articles having a decreased water vapor transmission rate and ability to withstand autoclaving conditions as evidenced by decreased tendency toward blistering, peeling and haze. The substrate comprises copolyesterethers of polytetramethyleneether glycol. The coating comprises a solution-deposited layer of a copolymer derived from about 70–99 weight % vinylidene chloride.

12 Claims, No Drawings

COPOLYESTERETHERS COATED WITH SARAN

DESCRIPTION

1. Technical Field

This invention relates to copolyesterether substrates coated with saran which has been deposited from solution. These substrates may be in the form of bags, blow-molded containers, etc., and exhibit improved resistance to blistering, peeling and haze when subjected to autoclaving.

2. Background of the Invention

Flexible polyester bags for intravenous solutions are normally packaged in an overwrap of high density polyethylene to retard loss of water from the solution. For a more economical container it would be desirable to eliminate the overwrap but this would require a polyester bag with a substantially reduced water vapor transmission rate. One way to effect such a reduction in transmission rate would be to coat the bag with a poly(-vinylidene chloride)-based polymer (saran) latex. Good reductions in water vapor transmission rate are obtained in this way, but the coating becomes hazy and loses adhesion when the bag is either autoclaved or stored at ambient conditions for a period of about 15 days. Unexpectedly, it has been discovered that when similar saran polymers are applied from solution rather than from a latex, coated bags are obtained which maintain good adhesion and appearance after autoclaving or extended storage. Such coated bags will provide a more economical system for the packaging of intravenous solutions.

Coating polyesters with saran latex is well known in the art. The improved retention of adhesion and clarity after autoclaving or storage of the saran solution coated bag relative to those coated from saran latex was totally unexpected.

Art of interest includes U.S. Pat. Nos. 3,188,234; 3,175,926; 3,794,515; 4,127,633; and Research Disclosure No. 20520 of May, 1981 (Vol. 205, printed by Commercial Print Services Limited). This art does not, however, disclose coating copolyesterethers with saran from solution. Also, U.S. Pat. No. 4,349,469, which is incorporated herein by reference, discloses the preferred copolyesterether.

DISCLOSURE OF THE INVENTION

According to the present invention, there is provided a coated article comprising a copolyesterether substrate and a coating, the article having a decreased water vapor transmission rate and ability to withstand autoclaving conditions as evidenced by decreased tendency toward blistering, peeling and haze.

The substrate comprises a copolyesterether derived from at least one dicarboxylic acid, at least one glycol of 2–16 carbon atoms and from about 15 to about 50 weight %, based on the weight of the polyesterether, of polytetramethyleneether glycol (PTMG) having a molecular weight of about 500 to about 1100.

The useful acids from which the copolyesterethers are derived are aliphatic dicarboxylic acids having 4–10 carbon atoms and phthalic acids. The term "phthalic" acids is intended to mean phthalic, isophthalic and terephthalic acids, and those acids having substituents of alkyl groups of 1 to 4 carbon atoms. Preferred acids are terephthalic and 1,4-cyclohexanedicarboxylic acids. The useful acids include mixtures of phthalic acid with aliphatic acids having 4–10 carbon atoms. Ester forming derivatives of the acids may also be used.

Preferred glycols are 1,4-butanediol and 1,4-cyclohexanedimethanol.

These acids, glycols and the PTMG are known in the art and many are commercially available. Processes for making the copolyesterethers are also known in the art. For example, see U.S. Pat. No. 4,349,469.

In an especially preferred embodiment of the invention, the substrate comprises copolyesterethers having an inherent viscosity of from about 0.8 to about 1.5 comprising A. a dicarboxylic acid component consisting essentially of 1,4-cyclohexanedicarboxylic acid having a trans isomer content of at least 70%, preferably at least 80%, B. a glycol component consisting essentially of
(1) 1,4-cyclohexanedimethanol, preferably having a trans isomer content of at least 60%, and
(2) from about 15 to about 50 weight percent, based on the weight of the polyesterether, of polytetramethyleneether glycol (PTMG) having a molecular weight of about 500 to about 1100 and C. from about 0.1 to about 1.5 mole %, based on the mole % of the acid or glycol component, of a branching agent having at least three functional groups consisting of COOH and/or OH and from 3 to 60 carbon atoms.

The coating comprises a solution-deposited layer of a copolymer derived from about 70–99 weight % vinylidene chloride (sometimes referred to herein as saran). The poly(vinylidene chloride) has a relative viscosity of about 0.8–1.8 as determined in tetra hydrofuran at 1% concentration at 25° C.

Also, according to this invention, there is provided a process for forming coated substrate material characterized by having a decreased water vapor transmission rate and ability to withstand autoclaving conditions as evidenced by decreased tendency toward blistering, peeling and haze.

The process comprises providing substrate material of copolyesterethers having an inherent viscosity of from about 0.8 to about 1.5, the copolyesterethers being derived from at least one dicarboxylic acid as described above, at least one glycol as described above and from about 15 to about 50 weight %, based on the weight of the polyesterether, of polytetramethyleneether glycol as described above.

In an especially preferred embodiment of the invention, the process comprises
(A) providing substrate material of copolyesterethers having an inherent viscosity of from about 0.8 to about 1.5, the copolyesterethers being derived from
(a) a dicarboxylic acid component consisting essentially of 1,4-cyclohexanedicarboxylic acid having a trans isomer content of at least 70%, preferably at least 80%
(b) a glycol component consisting essentially of
(1) 1,4-cyclohexanedimethanol preferbly having a trans isomer content of at least 60%, and
(2) from about 15 to about 50 weight percent, based on the weight of the polyesterether, of polytetramethyleneether glycol having a molecular weight of about 500 to about 1100 and
(c) from about 0.1 to about 1.5 mole %, based on the mole % of the acid or glycol component, of a branching agent having at least three functional groups consisting of COOH and/or OH and from 3 to 60 carbon atoms, (B) coating the substrate material with a solution of a copolymer derived from about 80-99 weight % vinylidene chloride having a relative viscosity of about 0.8-1.8 as determined in tetrahyrofuran at 1% concentration at 25° C., and (C) removing the solvent to leave a residue of the copolymer as an adherent coating on the copolyester substrate.

The copolyesterether substrate may be in the form of a sheet, film, package formed from sheet or film material, molded-container, extrusion blow-molded container, or the like.

The copolyesterether has high melt strength, high level of clarity and low odor. Furthermore, the polymer has a fast crystallization rate, allowing reasonably fast rates of production for molded articles such as bags, bottles or cast film.

1,4-Cyclohexanedicarboxylic acid and 1,4-cyclohexanedimethanol are well known in the art and commercially available. "Man-Made Fibers: Science and Technology," Vol. III, edited by Mark, Atlas and Cernia, published by Interscience Publishers describes preparation of thereof at page 85.

The PTMG component is commercially available, and is prepared by well known techniques. The PTMG used in the copolyesterether has a molecular weight of between about 500 and about 1100, preferably about 1000. It is used in an amount of from about 15 to about 50%, preferably about 20-35%, based on the total weight of the copolyesterether. It is interesting to note that if the molecular weight of the PTMG approaches 2000, the surface of film produced therefrom shows a white deposit.

The preferred copolyesterether further comprises from about 0.1 to about 1.5 mole %, based on the acid or glycol component, of a polybasic acid or polyhydric alcohol branching agent having at least three COOH or OH functional groups and from 3 to 60 carbon atoms. Esters of any such acids or polyols may also be used. Suitable branching agents include trimellitic acid or anhydride, trimesic acid, trimethylol ethane, trimethylol propane, and trimer acid.

The total acid reactants should be 100 mole %, and the total glycol reactants should be 100 mole %. Although for convenience the PTMG is specified in weight percent, the total mole % of PTMG, CHDM and polyol if used, combine to make 100 mole % glycol.

The copolyesterethers preferably include a phenolic antioxidant that is capable of reacting with the polymer intermediates. This causes the antioxidant to become chemically attached to the copolyesterether and be essentially nonextractable from the polymer. Antioxidants useful in this invention should contain one or more of an acid, hydroxyl, or ester group capable of reacting with the reagents used to prepare the copolyesterether. It is preferred that the phenolic antioxidant be hindered and relatively non-volatile. Examples of suitable antioxidants include tetrakis[methylene(3,5-di-tert-butyl-4-hydroxyhydrocinnamate)methane] which is commercially available from Geigy Chemical Company as Irganox 1010 antioxidant. Preferably, the antioxidant is used in an amount of from about 0.1 to about 1.0, based on the weight of copolyesterether.

The copolyesterethers are further characterized by their good melt strength. A polymer having melt strength is described as one capable of supporting itself on being extruded downward from a die in the melt. When a polymer with melt strength is extruded downward, the melt will hold together. When a polymer without melt strength is extruded downward, the melt rapidly drops and breaks.

Melting point or maximum peak during melting is determined on a differential scanning calorimeter Model DSC-2 from Perkin-Elmer Company at a heating rate of 20° C. per minute.

The trans and cis isomer contents of the preferred copolyesterether are controlled in order to give polymers that setup or crystallize rapidly. Cis and trans isomer contents are measured by conventional methods well known to those skilled in the art. Copolyesterethers similar to those of this invention that have a low glass transition temperature and do not crystallize are sticky and tacky and cannot be used for forming useful objects. Copolyesterethers that crystallize slowly require long processing times. Therefore, to decrease processing time it is highly desirable to use rapidly crystallizing polyesterethers. The rates of crystallization of copolyesterethers can be measured by determining the times to reach the peak crystallization exotherm during crystallization at various temperatures.

The saran should be derived from at least 70 wt. % vinylidene chloride and at most 20 wt. % of another monomer. The other monomers may include acrylonitrile, acrylates and methacrylates. The preferred composition of the saran is about 90 wt. % vinylidene chloride and 10 wt. % of another monomer. The poly(vinylidene chloride) copolymer should have a relative viscosity of 0.8 to 1.8 (as determined in tetrahydrofuran at 1% concentration at 25° C.), preferably 1.2 to 1.6. Such saran polymers are commercially available.

The saran is first dissolved in a suitable solvent and a solution of the saran is applied to one or both surfaces of the substrate material by any suitable means. Many application methods are well known to those skilled in the art, i.e., spraying, rolling, dipping, etc.

Conventional organic solvents or solvent blends may be used. Examples of suitable solvents include the following:

| Solvent | Bp, °C. | Evaporation Rate N—BuOAc = 1 |
|---|---|---|
| Acetone | 56 | 7.7 |
| Chlorobenzene | 132 | |
| Cyclohexanone | 157 | 0.2 |
| Cyclopentanone | 130 | |
| Dichlorobenzene | 172 | |
| Dimethylformamide | 153 | 0.2 |
| Dioxane, (1,4) | 101 | |
| Ethyl Acetate | 77 | 4.1 |
| Methyl Ethyl Ketone | 80 | 3.8 |
| Pyridine | 115 | |
| Tetrahydrofuran | 66 | 6.3 |
| n-Butyl Acetate | 124 | 1 |

Of the solvents listed above, chlorobenzene, cyclopentanone, 1,4-dioxane, ethyl acetate, methyl ethyl ketone, and n-butyl acetate, and mixtures thereof are preferred. A blend of n-butyl acetate and methyl ethyl ketone is especially preferred.

In applying the coating to the substrate, care should be taken so that the rate of evaporation of the solent is not excessively fast. Rate of evaporation is affected by volatility of the solvent, temperature, and pressure. It is within the skill of the art to select optimum conditions for forming good coatings. The evaporation rates of several solvents are shown in the table above for comparison with n-butyl acetate, which is 1.0. Also, the solvent should not be a solvent for the copolyesterether substrate.

Drying of the coating is accomplished by well known means, such as by heating in an oven, air-drying, etc.

In a preferred embodiment of the invention, extrusion blow-molded containers, or bags, are coated on the outside by dipping the preformed bags into the solution and dried in an air oven.

Because of the increased adhesion of the saran to the bags, improved clarity, and autoclavability, such bags will be useful for packaging intravenous and irrigation solutions for medical purposes where improved barrier properties are required.

The following examples are submitted for a better understanding of the invention.

EXAMPLE 1

This example represents a general procedure which can be used to prepare the copolyesterethers. Other procedures are known in the art. For example, see U.S. Pat. Nos. 3,023,192; 3,013,914 and 3,763,109. A preferred copolyesterether, poly(1,4-cyclohexanedimethylene-1,4-cyclohexanedicarboxylate) modified with 18 weight percent of 1000 molecular weight polytetramethyleneether glycol, 0.20 mole percent of trimellitic anhydride, and 0.20 weight percent of Irganox 1010 is prepared by combining 90.42 grams (0.4521 moles) of dimethyl-1,4-cyclohexanedicarboxylate, 64.40 grams (0.447 moles) of 1,4-cyclohexanedimethanol, 27.04 grams (0.02704 moles) of 1000 molecular weight polytetramethyleneether glycol, 0.17 grams (0.000885 moles) of trimellitic anhydride, 0.30 grams (0.20 weight percent of total polymer prepared) of Irganox 1010, and 150 parts per million of titanium from acetyl triisopropyl titanate. These reagents are calculated on the basis of preparing 150 grams of polymer. The dimethyl-1,4-cyclohexanedicarboxylate used contains 96.5 percent of the trans isomer and 3.5 percent of the cis isomer. The 1,4-cyclohexanedimethanol contains 45 percent of the trans isomer and 55 percent of the cis isomer. The amount of 1,4-cyclohexanedimethanol used in preparation of the polymer is five mole percent greater that that needed to prepare the theoretical polymer. The reactants are heated with stirring under nitrogen in a 220° C. metal bath screen.

The amount of excess 1,4-cyclohexanedimethanol used in preparation of the copolyesterethers should be kept between about one and about 10 mole percent. High excesses thereof seriously reduce the polycondensation rate. The preferred excess is between about one and about five mole percent. A theoretical amount can be used but it is difficult to obtain equivalent amounts of acid and hydroxyl. Above about 10 mole percent excess 1,4-cyclohexanedimethanol, the polycondensation rate is reduced, so that the time for reaching a particular I.V. is increased under a given temperature and pressure. The I.V. must be built up in a reasonable time before excess degradation occurs.

In addition to the process described in Example 1, the copolyesterethers can be polymerized in the solid phase using conventional procedures. A relatively low inherent viscosity copolyesterether prepared as in Example 1 is heated at a temperature upto about 5° C. of the melting point in a flow of inert gas or at a reduced pressure. The copolyesterether should have an inherent viscosity of at least 0.80.

EXAMPLE 2 (Control)

An extrusion blow-molded polyesterether (I.V. 1.16) bag (1 liter; filled with water) is coated with Saran latex 150 (53.5% solids), a product of Dow Chemical Co., and dried in an air oven at 80° C. for 30 seconds. Saran latex 150 is a copolymer of 92 weight % vinylidene chloride and 8 weight % of a combination of acrylonitrile and acrylate, having a relative viscosity of about 1.4.

The copolyesterether is prepared from:
(a) 100 mole % 1,4-cyclohexanedicarboxylic acid having a trans content of about 80%;
(b) 1,4-cyclohexanedimethanol;
(c) 25 weight % polytetramethyleneether glycol having a molecular weight of 1000; and
(d) 0.5 mole % trimellitic anhydride.

The coated bag side-wall has a water vapor transmission rate of about 0.2 g/100 sq. in./24 hr. compared to a value of about 9 for an uncoated bag. The bag is placed in an autoclave and heated to 250° F. (121° C.; 15 psi) and maintained for one hour. The autoclave is cooled down to less than 200° F. under a constant nitrogen pressure of 15 psi. The autoclaved bag is almost opaque and has considerable Saran peeling. It is, therefore, unacceptable for both performance and appearance reasons.

EXAMPLE 3

An extrusion-blow molded polyesterether (same as in Example 2) bag is coated with a solution of Saran F-310, a product of Dow Chemical Co. Saran F-310 is a copolymer of 80 weight % acrylonitrile, having a relative viscosity of about 1.4. The solution contains 14 weight % saran, 37.8 weight % n-butyl acetate and 48.2 weight % methyl ethyl ketone. The bag is dried in a 100° C. air oven for about three minutes. The coated bag side wall has a water vapor transmission rate of about 1 g/100 sq. in./24 hr., compared to a value of about 9 for the control. The coated bag is autoclaved as in Example 1. There is no detection of Saran blistering or peeling or haze of the solution coated bag after autoclaving.

Unless otherwise specified, all parts, percentages, ratios, etc., are by weight.

Molecular weights are weight average.

Unless otherwise specified, the inherent viscosity (I.V.) of polyesterethers is determined at 25° C. using 0.5 gram polymer per 100 ml. of a solvent composed of 60 weight % phenol and 40 weight % tetrachloroethane.

The invention has been described in detail with particular reference to preferred embodiments thereof, but it will be understood that variations and modifications can be effected within the spirit and scope of the invention.

We claim:
1. A coated article comprising a substrate and a coating, said article having a decreased water vapor transmission rate and ability to withstand autoclaving conditions as evidenced by decreased tendency toward blistering, peeling and haze, said substrate comprising copolyesterethers having an inherent viscosity of from about 0.8 to about 1.5 comprising
   A. an acid component comprising at least one dicarboxylic acid selected from aliphatic dicarboxylic acids having 4–10 carbon atoms and phthalic acids, and

B. a glycol component comprising
  (1) at least one glycol having 2–16 carbon atoms and
  (2) from about 15 to about 50 weight percent, based on the weight of the polyesterether, of polytetramethyleneether glycol having a molecular weight of about 500 to about 1100, said coating comprising a solution-deposited layer of a copolymer derived from about 70–99 weight % vinylidene chloride and having a relative viscosity of about 0.8–1.8 as determined in tetrahydrofuran at 1% concentration at 25° C.

2. A coated article according to claim 1 wherein said copolyesterether are derived from an acid component comprising phthalic acid or 1,4-cyclohexanedicarboxylic acid and said glycol component comprises 1,4-cyclohexanedimethanol.

3. A coated article according to claim 1 wherein said coating comprises a copolymer derived from about 80–90 weight % vinylidene chloride and about 20–10 weight % of a comonomer comprising acrylonitrile, methacrylate, acrylate, or blends thereof.

4. A coated article according to claim 1 wherein said coating comprises one or more solvents selected from acetone, chlorobenzene, cyclohexanone, cyclopentanone, dichlorobenzene, dimethylformamide, dioxane, ethyl acetate, methyl ethyl ketone, pyridine, tetrahydrofuran and n-butyl acetate.

5. A coated article according to claim 4 wherein said coating comprises one or more solvents selected from chlorobenzene, cyclopentanone, 1,4-dioxane, ethyl acetate, methyl ethyl ketone, n-butyl acetate and mixtures thereof.

6. A coated article according to claim 5 wherein said coating comprises one or more solvents selected from n-butyl acetate and methyl ethyl ketone.

7. A coated article comprising a substrate and a coating, said article having a decreased water vapor transmission rate and ability to withstand autoclaving conditions as evidenced by decreased tendency toward blistering, peeling and haze, said substrate comprising copolyesterethers having an inherent viscosity of from about 0.8 to about 1.5 comprising A. a dicarboxylic acid component consisting essentially of 1,4-cyclohexanedicarboxylic acid having a trans isomer content of at least 70%, B. a glycol component consisting essentially of
  (1) 1,4-cyclohexanedimethanol, and
  (2) from about 15 to about 50 weight percent, based on the weight of the polyesterether, of polytetramethyleneether glycol having a molecular weight of from about 500 to about 1100 and C. from about 0.1 to about 1.5 mole %, based on the mole % of the acid or glycol component, of a branching agent having at least three COOH or OH functional groups and from 3 to 60 carbon atoms, said coating comprising a solution-deposited layer of a copolymer derived from about 80–99 weight % vinylidene chloride and having a relative viscosity of about 0.8–1.8 as determined in tetrahydrofuran at 1% concentration at 25° C.

8. A coated article according to claim 5 wherein said copolyesterether further comprises a solution-deposited layer of a copolymer derived from about 80–99 weight % vinylidene chloride and having a relative viscosity of about 0.8–1.8 as determined in tetrahydrofuran at 1% concentration at 25° C.

9. A coated article according to claim 5 wherein said coating comprises a copolymer derived from about 80–90 weight % vinylidene chloride and about 20–10 weight % of a comonomer comprising acrylonitrile, methacrylate, acrylate, or blends thereof.

10. A coated article according to claim 5 wherein said coating comprises one or more solvents selected from acetone, chlorobenzene, cyclohexanone, cyclopentanone, dichlorobenzene, dimethylformamide, dioxane, ethyl acetate, methyl ethyl ketone, pyridine, tetrahydrofuran and n-butyl acetate.

11. A coated article according to claim 8 wherein said coating comprises one or more solvents selected from chlorobenzene, cyclopentanone, 1,4-dioxane, ethyl acetate, methyl ethyl ketone, n-butyl acetate and mixtures thereof.

12. A coated article according to claim 9 wherein said coating comprises one or more solvents selected from n-butyl acetate and methyl ethyl ketone.

* * * * *